United States Patent [19]
Halberschmidt et al.

[11] Patent Number: 4,619,683
[45] Date of Patent: Oct. 28, 1986

[54] GLASS SHEET BLOWING ASSEMBLY

[75] Inventors: Friedrich Halberschmidt, Herzogenrath; Heinz-Josef Reinmold; Josef Audi, both of Aachen; Cornelius Puetz, Hueckelhoven; Gerd Schubert, Herzogenrath, all of Fed. Rep. of Germany

[73] Assignee: Vegla, Aachen, Fed. Rep. of Germany

[21] Appl. No.: 765,610

[22] Filed: Aug. 14, 1985

[30] Foreign Application Priority Data

Aug. 22, 1984 [FR] France .................. 84 13068

[51] Int. Cl.$^4$ ............................................. C03B 27/00
[52] U.S. Cl. .................................. 65/351; 65/104; 65/114; 65/348
[58] Field of Search .................. 65/104, 114, 351, 348

[56] References Cited

U.S. PATENT DOCUMENTS

| | | | |
|---|---|---|---|
| 2,213,405 | 9/1940 | Paddock | 65/114 |
| 3,454,388 | 7/1969 | Ritter, Jr. | 65/351 X |
| 3,545,951 | 12/1970 | Nedelec | 65/104 |
| 4,140,511 | 2/1979 | Imler | 65/114 |

FOREIGN PATENT DOCUMENTS

| | | |
|---|---|---|
| 0123120 | 3/1983 | European Pat. Off. . |
| 0107565 | 2/1984 | European Pat. Off. . |
| 1135411 | 12/1956 | France . |
| 557478 | 2/1957 | Italy ............ 65/114 |

Primary Examiner—Arthur Kellogg
Attorney, Agent, or Firm—Marmorek, Guttman & Rubenstein

[57] ABSTRACT

The invention is concerned with the thermal tempering of glass sheets. In the practice of the invention, the glass blowing assemblies (3, 4) of a glass blowing device for the thermal tempering of glass sheets are formed of a plurality of tubular bodies (15) which are disposed side by side and provided with blowing outlets (20) which are directed towards the glass sheet. The tubular bodies (15) are interconnected by joints (34) and maintained in position by deformable guide rails (24). The shape of rails (24) is obtained by means of adjustable fixing means (40) whose position can be changed by programmable servo-motors (47). The adjustment of fixing means (40) causes with it that of guide rails (24) and accordingly the shape of the glass blowing assembly (3, 4) constituted by the tubular bodies (15) is adjusted to the shape of the glass sheet.

The invention finds utility in the thermal tempering of glass sheets which are curved cylindrically and spherically.

12 Claims, 3 Drawing Figures

GLASS SHEET BLOWING ASSEMBLY

BACKGROUND OF THE INVENTION

This invention is concerned with a glass blowing device for the thermal tempering of glass sheets, which device is constituted by two glass blowing assemblies which face one another and consist each of a plurality of tubular bodies, disposed side by side, parallel to the glass sheets and whose openings or nozzles are directed toward the sheets and are adjustably mounted on a chassis in order to adapt to the various shapes of the glass sheets.

In contrast with the fixed glass blowing caissons in which the blowing nozzles are disposed on a fixed front panel of the caissons and which must be completely exchanged against other glass blowing caissons if there occurs a change in the shape of the glass sheets to be tempered, the glass blowing devices according to this invention have the advantage that by an adjustment of the glass blowing assemblies, the surface formed by the assembly of the nozzle can take any desired cylindrical or spherical shape in such a way that it can adapt itself to most of the glass sheet shapes currently in use.

DESCRIPTION OF PRIOR DISCLOSURE

A prior art glass blowing device is disclosed in U.S. Pat. No. 2,213,405 in which each glass blowing tubular body is attached to two retaining rails which slide in supports and thus can assume any desired position. When it is necessary to adapt the glass blowing device to the shape of the glass sheets, the attachments of each tubular body must be loosened and replaced in a new position. Owing to the fact that the glass blowing device has a large number of tubular blowing bodies, the transformation of the device to adapt it to a new shape of glass sheets is slow and expensive.

OBJECT AND SUMMARY OF THE INVENTION

The present invention has for an object to provide a blowing device of the above described type which makes it possible to adapt the device to a different shape of glass sheets in a very short time.

This problem is solved by the practice of the invention, wherein the tubular bodies of each glass blowing assembly are maintained in position along the entire width of said assembly, by deformable guide rails placed perpendicularly to the tubular bodies, the shape of these rails being set by at least one adjustable attachment.

In accordance with the simplest embodiment of the invention, each deformable rail is maintained in position at its extremities by fixed supports and at its center by an adjustable central support. By adjusting this central support, the deformable rail assumes the shape of an arc of a circle which corresponds to the curvature of the glass sheets. Owing to the fact that these tubular bodies with their blowing nozzles are simply attached to these rails, the blowing surface thus obtained is also adjusted to the shape of the curved glass sheets.

The glass blowing device according to the invention thus has the advantage that very simply by the movement and eventually of only one fastener of each deformable rail, all the tubular bodies of a glass blowing assembly have their position corrected simultaneously to be adjusted to another shape of glass sheets.

If only cylindrically curved glass sheets are to be treated, then the tubular bodies can be formed of a rigid material, preferably a metallic material.

According to another particularly advantageous embodiment of the invention, the tubular bodies can be made of a flexible material. When such flexible tubular bodies are maintained approximately in the middle of an additional deformable rail and these deformable rails are themselves maintained by adjustable fasteners, then the blowing assemblies thus constituted can be deformed along two directions and can thus adapt themselves even to glass sheets which are spherically curved.

BRIEF DESCRIPTION OF THE DRAWINGS

Other characteristics and advantages of the invention will appear in the following description which is made in nonlimiting fashion with respect to the accompanying drawings which show.

DESCRIPTION OF BEST MODES OF THE INVENTION

The device according to the invention is in its operating principle related just as well to a vertical tempering installation in which the glass sheets are transported in vertical position through the glass blowing oven and of a glass blowing device suspended to clamps as well as to a horizontal tempering installation in which the glass sheets are transported horizontally. In the case of the horizontal transport, the sheets can move on simple rollers, on curved rollers, or they can be conveyed on a transport frame whose shape corresponds to that of the curved sheet. It is also possible to do without these mechanical supports. In this case, the glass sheet is supported by air jets issuing from a lower blowing assembly and which deliver air at a pressure higher than that of the upper blowing assembly with mechanical means bringing about the horizontal movement of the glass sheets.

In the following disclosure there will be described two embodiments utilizing the horizontal transportation of the sheets, in one case with rollers and in the other case with the aid of a transport frame.

Figure 1:
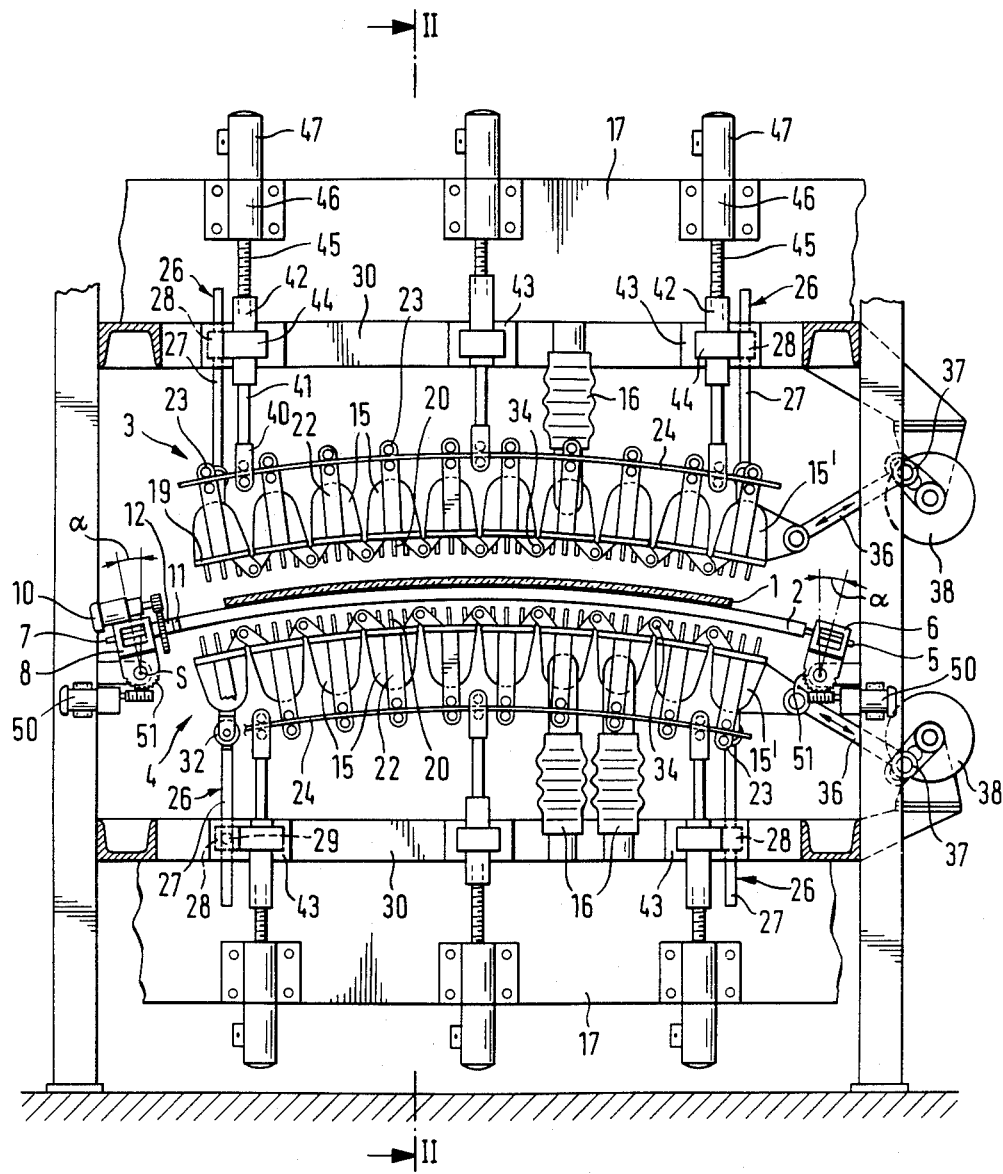
FIG. 1 is a front view of a glass blowing device for cylindrically curved glass sheets which are carried horizontally on rollers positioned across a horizontal tempering installation.
Figure 2:
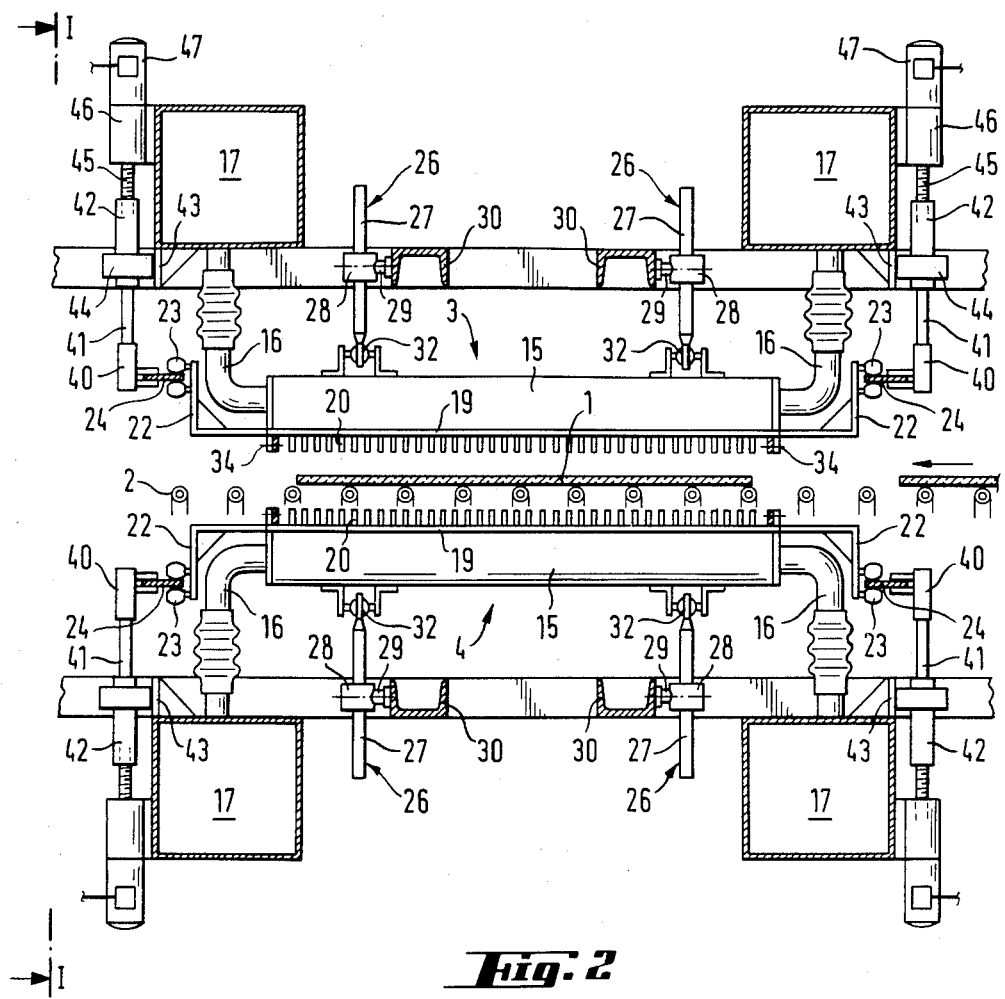
FIG. 2 is a vertical cross section of the device of FIG. 1 taken along line II—II; and, FIG. 3 is a glass blowing device for spherically curved glass sheets shown along a vertical plane which cuts across a glass blowing device along the tubular bodies thereof.

In the embodiment shown in FIGS. 1 and 2, the glass sheets 1 are transported from the shaping oven (not shown) to the blowing device of the invention along curved transport rollers 2 whose shape is adapted to that of the cylindrically curved glass sheets 1. The glass blowing device comprises an upper blowing assembly 3 disposed above curved rollers 2 which form the transport path for the glass sheets and a lower blowing assembly 4 positioned under this transport path.

The curved transport rollers 2 consist of a deformable rod whose core is formed by a series of small rods which are juxtaposed parallel to one another and surrounded by a helicoidal spring. One of these extremities 5 of this deformable rod is housed in a variable support 6 and the other extremity 7 in an adjustable support 8. The supports 6 and 8 are movable around an axis of rotation S and can be fixed along the desired angle α. In this manner it is possible to give to each deformable rod of each transport roller 2 the curvature adapted to the shape of the glass sheet.

On these deformable rods are placed sheaths which are deformable in the axial direction but resistant to a torsional effort and which are rotated at the desired speed by the motor 10. These deformable rotary sheaths can be of the type described in the European patent application No. 0 107 565. They are equipped at one end with a driving ring 11 coupled to a driving sleeve 12 driven by motor 10. This device with deformable curved rollers adaptable to the shape of the glass sheets is known in itself for use in tempering installations.

Each blowing assembly 3, 4 is constituted by a series of tubular bodies 15 connected by channels 16 to wind boxes 17. These wind boxes 17 are fed with the necessary blowing air by blowers (not shown). On the side of the glass sheet 1, the tubular bodies 15 are equipped with a front panel 19 on which are connected blowing nozzles 20 which have the shape of small tubes.

As shown in greater detail in FIG. 2, each tubular body has at its two ends supports 22 which are rendered movable by means of rollers 23 which travel on a deformable guide rail 24. The tubular bodies 15 thus can move along the guide rails 24 through the agency of these mobile supports 22 with rollers 23.

To ensure the stability of the blowing assemblies, at least two of the tubular bodies 15 of each assembly are additionally provided with mobile sliding guides 26 which exactly maintain tubular bodies 15 in the direction of their longitudinal axes. These sliding guides 26 are all the more important when the blowing assemblies 3 and 4 are not positioned horizontally as shown here but vertically in order to temper sheets of glass which are transported while hanging in vertical position. In this case they then support the weight of the blowing assemblies in such a way that the deformable rails 24 merely ensure the guiding function for molding the surface of blowing of each assembly formed by the front panels 19 of tubular bodies 15.

The sliding guides 26 consist of bars 27 passing through sleeves 28. These sleeves 28 are urged by rotatable supports 29 on a carrying chassis 30. Bar 27 is fixed to the tubular body 15 by a swivel joint 32. In this manner, the tubular bodies 15 can effect translational movements along two directions which are transverse to the axes of the tubular bodies, while any movement along the direction of the longitudinal axis is prevented.

Tubular bodies 15 are mutually connected by joints 34, on their front side, in such a way that each glass blowing assembly forms a unit. A crank 36 is pivoted on the tubular bodies at the extremity 15' of each blowing assembly, which crank places the blowing assemblies 3 and 4 in oscillatory movements because of the connecting rod 37 which is rotated by motor 38. In this manner the tubular bodies 15 move along the curved path formed by the guide rails 24.

The deformable guide rails 24 preferably are made of tempered steel. They are mounted at three points by fasteners 40 distributed along their length and facing the pair of rollers 23. These fasteners 40 are positioned each at the end of an adjustable bar 41. These adjustable bars 41 each carry at their other extremity a guiding sleeve 42 positioned in a sliding guide 44, itself mounted on chassis 43. The sleeve 42 receives a threaded stem 45 which is moved by servomotor 47 acting on its gearing 46.

By suitably operating motor 47, the fasteners 40 are positioned in such a way that the curvature formed by the guide rails 24 correspond to the shape of the glass sheets. It is also possible to automatically position fasteners 40, for example, by storing in a disk the various position data of the fasteners which correspond to the different shapes of the glass sheets. These data are selectively recalled which occasions immediately the desired modification of the guide rails 24.

Figure 3:
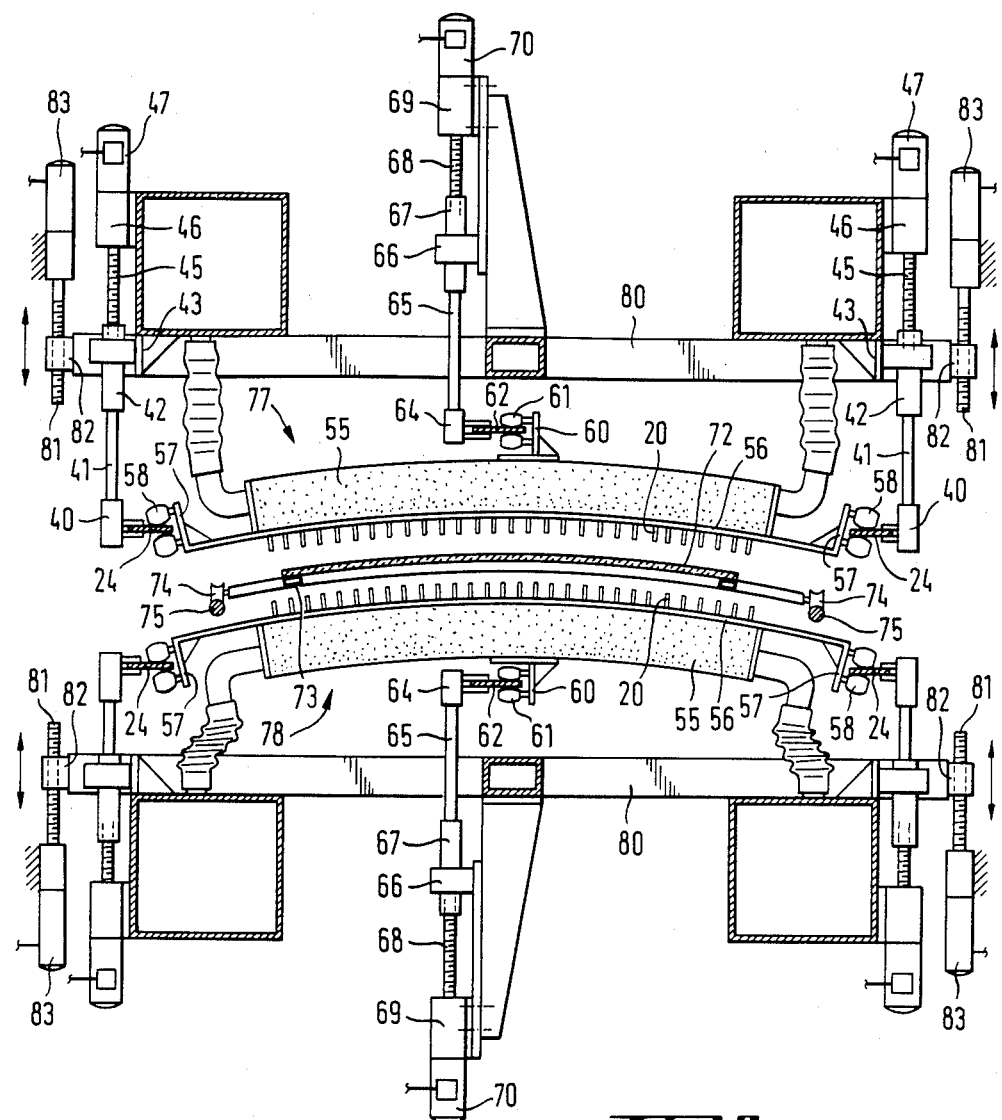

Since for all modification of the shape of the glass sheets, the shape of the deformable curved rollers 2 is to be modified simultaneously, the necessary change in shape of these rollers 2 can be simultaneously allied to the automatic modification of the shape of the guide rails 24. To this effect, the adjustable supports 6, 8 can be respectively equipped with a control which makes possible the automatic adjustment of the angle of incidence α of the supports 6, 8. Such an automatic adjustment of the incidence of supports 6, 8 is shown on FIG. 1 with respectively a servomotor 50 which can be programmed and which by its own gearing acts on a toothed wheel 51. The data necessary for the running of servomotors 47 and 50 will be stored in the same manner FIG. 3 shows in detail a device for glass blowing whose blowing surface is defined by nozzles 20 as a spherical curved surface whose curvature is adjustable along two directions. The main difference of this embodiment with the device described with respect to FIGS. 1 and 2 is that here the tubular bodies identified by reference character 55 are made of a flexible material and in particular of a highly elastic plastic material such as, for example, a silicone based rubber. The front panel 56 of each tubular body 55 can consist of steel sheets which are highly elastic and it extends beyond the extremities of the tubular body 55 and is provided with attachments 57 for convex guide rollers 58 which make possible the movement of the tubular bodies 55 along rails 24.

In order to give the tubular bodies 55 the desired curvature along their longitudinal axis, there is provided in addition to the curving means utilizing rollers 58 and fasteners 57 acting on the extremities of the tubular bodies 55, a further curving means which acts on the middle of said tubular bodies 55. For this purpose, a fastener 60 is fixed on the back of each tubular body 55 and the fastener in this case carries guide rollers 61. These guide rollers 61 travel on a deformable guide rail 62 which is maintained in correct position by stops 64. Each stop 64 is situated at one end of an adjustable bar 65; at the other extremity, there is placed a guide sleeve 67 slidable in a sliding support 66. A threaded rod 68 is received by this sleeve 67 and actuated by servomotor 70 through gearing 69. As is the case with the servomotors 47, the servomotors 70 which serve to deform the tubular bodies 55 along the transverse direction, can be automatically controlled by a suitable program.

Since in the case of a spherical curvature the transport of the glass sheets 72 on the curved transport rollers is impossible, the glass sheet 72 must be transported to the glass blowing station on a transport frame 73. The latter has a shape adapted to the contour of the curved glass sheet 72. In known manner, it is positioned on rollers 74 which move on rails 75. It is necessary to be able to space the two blowing assemblies 77, 78 sufficiently to permit the introduction of the transport frame 73 and consequently that of the glass sheets, in the blowing installation. To this effect, each blowing assembly is mounted respectively on a frame 80, placed on a height adjustable assembly, formed of shaft 81 and nut 82. According to the rate of advance of the sheets, a servomotor 83, also programmed, moves these frames in open or closed positions.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so reveal the gist of this invention that those skilled in the art can, by applying current knowledge thereto, readily adapt it to various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. A glass blowing device including two mutually facing blowers having a plurality of tubular bodies placed side-by-side and nozzles directed toward shaped glass sheets placed between said blowers along a blowing surface,
   said tubular bodies being adjustably mounted so as to adapt to the particular shape of said sheets;
   deformable guide rails positioned perpendicularly to said tubular bodies for supporting said tubular bodies of each of said blowers in various positions along the entire width of said blowing surface;
   at least one adjustable fastener for deforming said guide rails to a desired shape;
   and servomotor means programmed to effect correct positioning of said adjustable fastener.

2. The device of claim 1, having three adjustable fasteners for deforming said guide rails.

3. The device of claim 1, further including at least two rollers overlapping said guide rails to correctly place said tubular bodies on said guide rails and permit translational movement of said tubular bodies along said guide rails.

4. The device of claim 1 further including joint means connecting said tubular bodies.

5. The device of claim 1, further including crank transmission means associated with each of said blowers and which impart an oscillating movement to said blowers.

6. The device of claim 1, further including:
   a rotary support;
   movable guide sleeves about said rotary support,
   bars in said guide sleeves and wherein said tubular bodies are pivoted on said bars.

7. The device of claim 6, further including swivel joints connecting said tubular bodies to said bars.

8. The device of claim 1, wherein said tubular bodies consist of a flexible material.

9. The device of claim 8, wherein said material is a silicone-based material.

10. The device of claim 8, further including an additional fastener, guide rollers and an additional guide rail,
    adjustable fasteners for giving said additional guide rail a desired position and shape; each pair of rollers overlapping said additional guide rail.

11. In a glass blowing device for the thermal tempering of curved glass sheets which device comprises a pair of facing blowers constituted by a plurality of tubular bodies placed in side-by-side arrangement with nozzles directed against said glass sheets positioned on a blowing surface between said blowers and wherein said nozzles are adjustably mounted on a chassis to espouse the shape of said sheets, the improvement comprising:
    deformable guide rails situated perpendicularly to said tubular bodies for supporting said bodies of each of said blowers along various locations on substantially the entire width of said blowing surface, at least one adjustable fastener for deforming said guide rails to a shape corresponding to the shape of said glass sheets, and servomotor means programmed to effect correct positioning of said adjustable fastener.

12. A glass blowing device for tempering a shaped glass sheet comprising
    a deformable support for said glass sheet,
    adjustment means for deforming said support,
    first servomotor means associated with said adjustment means,
    two mutually facing blowers having a plurality of tubular bodies placed side-by-side and nozzles directed toward said shaped glass sheet placed between said blowers on said deformable support, said tubular bodies being adjustably mounted so as to adapt to the shape of said glass sheet,
    deformable guide rails positioned perpendicularly to said tubular bodies for supporting said tubular bodies of each of said blowers in various positions along said deformable support,
    at least one adjustable fastener for deforming said guide rails to conform to the shape of said glass sheet, and
    second servomotor means associated with said adjustable fastener,
    said first and second servomotor means being programmably controlled to adapt the shape of said deformable guide rails and said deformable support to the shape of said glass sheet.

* * * * *